(12) United States Patent
Yoda et al.

(10) Patent No.: US 7,127,510 B2
(45) Date of Patent: Oct. 24, 2006

(54) ACCESS CHAIN TRACING SYSTEM, NETWORK SYSTEM, AND STORAGE MEDIUM

(75) Inventors: Kunikazu Yoda, Tokyo (JP); Hiroaki Etoh, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 09/770,531

(22) Filed: Jan. 26, 2001

(65) Prior Publication Data

US 2001/0014093 A1    Aug. 16, 2001

(30) Foreign Application Priority Data

Feb. 2, 2000    (JP) ............................. 2000-025594

(51) Int. Cl.
*G06F 15/16* (2006.01)
*G06F 15/173* (2006.01)
(52) U.S. Cl. ...................... 709/225; 709/201
(58) Field of Classification Search ............... 713/201, 713/153, 157, 178, 160; 370/21.8; 709/201, 709/224, 225, 229
See application file for complete search history.

(56) References Cited

U.S. PATENT DOCUMENTS

| | | | | | |
|---|---|---|---|---|---|
| 5,220,655 | A | * | 6/1993 | Tsutsui | 709/229 |
| 6,128,316 | A | * | 10/2000 | Takeda et al. | 370/468 |
| 6,389,016 | B1 | * | 5/2002 | Sabaa et al. | 370/389 |
| 6,466,543 | B1 | * | 10/2002 | Aoki | 370/230 |
| 6,502,135 | B1 | * | 12/2002 | Munger et al. | 709/225 |
| 6,751,194 | B1 | * | 6/2004 | Ueno | 370/235 |

* cited by examiner

*Primary Examiner*—Jason Cardone
*Assistant Examiner*—Minh-Chau Nguyen
(74) *Attorney, Agent, or Firm*—Douglas W. CAmeron; Anne Vachon Dougherty

(57) ABSTRACT

Log data for a packet that is exchanged across a network are recorded in a log box. At this time, the data size of the packet and the detection time are recorded. When an illegal access has occurred at a target computer, the tracing of an access chain is performed on the log information. The tracing of the access chain is performed as follows. A change in the size of the data in a packet in accordance with the time of the first connection, and a change in the size of the data in a packet in accordance with the time of the second connection are calculated using the log data, and then the shapes of the graphs formed by these packet series are compared. When the shapes of the graphs are similar, it is ascertained that the pertinent connections are included in the same chain.

15 Claims, 7 Drawing Sheets

FIG.6

| 0 1 2 3 | 4 5 6 7 | 8 9 10 11 12 13 14 15 | 16 17 18 19 20 21 22 23 24 25 26 27 28 29 30 31 |
|---|---|---|---|
| VERSION | HL | TYPE OF SERVICE | TOTAL LENGTH |
| IDENTIFICATION | | FLAGS | FRAGMENT OFFSET |
| TIME TO LIVE | PROTOCOL | | HEADER CHECKSUM |
| SOURCE ADDRESS ||||
| DESTINATION ADDRESS ||||
| OPTION ||| PADDING |

FIG.7

| SOURCE PORT | DESTINATION PORT |
|---|---|
| SEQUENCE NUMBER ||
| ACKNOWLEDGEMENT NUMBER ||
| DATA OFFSET / RESERVED / URG ACK PSH RST SYN FIN | WINDOW |
| CHECKSUM | URGENT POINTER |
| OPTIONS | PADDING |
| DATA ||

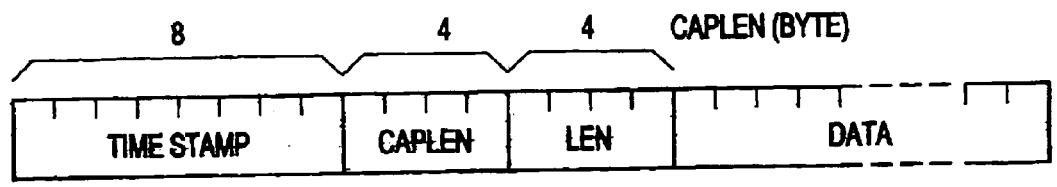
FIG.8
FIG.9
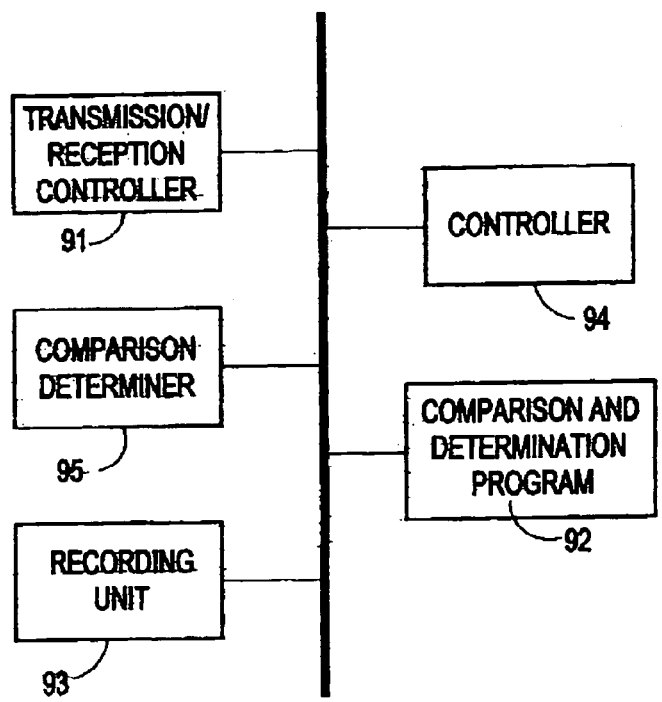

ACCESS CHAIN TRACING SYSTEM, NETWORK SYSTEM, AND STORAGE MEDIUM

FIELD OF THE INVENTION

The present invention relates to a technique for tracing an access chain across a network, and relates in particular to a technique for tracing an access chain based on the size of data packets and the detection time.

BACKGROUND OF THE INVENTION

The Internet has become extremely popular because of the availability of data access means that can remove limits imposed by time and space, and because of the anonymity it bestows. But since the Internet is accessible to all, it is peculiarly susceptible to misuse by those wishing to commit network crimes; the benefits it confers are available to intruders and to ordinary users alike. Therefore, the number of unauthorized access attacks has increased and the range of the targets that are attacked has expanded, to the extent that it is difficult to identify an intruder and to fully apprehend why an attack was mounted. Furthermore, since at certain home pages on the Internet instructions and guidance for effecting unauthorized entries are readily available, for sale or for free, knowledge of how to mount intrusive attacks is widely disseminated and since it is apparent that the effectiveness of the procedures employed is constantly being improved, it is anticipated that illegal access attacks will occur ever more frequently in the future.

A problem encountered in providing adequate protection for systems, so as to prevent the occurrence of illegal accesses, is that the configurations of systems deserving protection tend to vary daily. For example, update packages are frequently released for the Linux operating system; each month, one or more modules are published to correct system defects or errors or to provide improved functions. Furthermore, the problem of providing adequate protection is further compounded since, as is mentioned above, the methods available for effecting illegal accesses are constantly being improved, as are the means for concealing the identities of intruders, which complicates the task of identifying them. Under the prevailing conditions, therefore, it is difficult to devise a specific protection system that can absolutely prevent all illegal accesses. For the above described reasons, a system that can prevent the occurrence of large numbers of illegal accesses is urgently needed.

Crimes committed using the Internet include mail bombings, denial-of-service attacks, unauthorized intrusions, and the transmission of slanderous, malicious gossip. In many cases, in the commission of these crimes, to hide their identities attackers employ systems whereby their transmissions are routed via third parties. Such a system, whereby a third party is involuntarily involved, is called a stepping-stone computer system.

A method used for an illegal intrusion will now be described while referring to FIG. 1. In the schematic diagram in FIG. 1, an attacker's computer 11 is used to effect an illegal intrusion of a targeted host 16 via a plurality of host computers 12 to 15, and a network 17 to which these computers are connected. In this setup, the routing of packets on the network 7 is controlled by a router 18. So in order to hide his or her identity, the attacker, hereinafter referred to as the attacker 11, attacks the target host 16 via one or more of the steppingstone computers 12 to 15.

In order to assume control of the stepping-stone computers that are to be employed, the attacker 11 exploits perceived system setup inadequacies or OS bugs to access them. Thereafter, to attack the target computer 16, the attacker 11 transmits data packets via the several stepping-stone computers 12 to 15 to the target computer 16. To assault the target computer 16, the attacker 11 employs what is called an illegal access chain, for which telnet or rlogin is employed or a changed port number.

Given the current Internet environment, it is not easy to trace backward along an illegal access chain. Only the IP address of the stepping-stone host immediately before a targeted computer can be extracted from a packet header. Therefore, generally, when an attempt is made to obtain the address of the host that precedes the last stepping-stone host, permission to do so is denied and further analyzation and tracing of the access chain continued because management of the stepping-stone hosts is being exercised by the third party. Therefore, it is difficult for the sources of packet used to effect an illegal access to be obtained and for transmission source addresses to be traced back in order.

Therefore, a system has been studied that would provide for the automatic tracing of an illegal access chain. Depending on the location of tracing components, the illegal access tracing method can be roughly classified as having two subdivisions: a "host base" process and a "network base" process. According to the host base process, a tracing component is located at each host, while according to the network base process, a tracing component is located at the infra (e.g., a router or a switch) of a network. The following host base tracing methods are also used.

DIDS (Distributed Intrusion Detection System)

This system, which originated at University of California at Davis but which is presently being developed by Trident Data Systems Corp., monitors all TCP connections and logins occurring on a network over which it exercises control. Thus, the system constantly collects information concerning all activities within the area of its responsibility and monitors changes in the state of the network that occur as a result of user logins. Monitors, one of which is located at each host, collect information relative to network accesses by the local hosts, and transmit the information to a central DIDS director. The central DIDS director is thus able to collectively manage the state of the network state. The procedures and methods employed for this technique are explained in detail in "DIDS (Distributed Intrusion Detection System)—Motivation, Architecture, And An Early Prototype," S. Snapp et al., Proceedings of the 14th National Computer Security Conference, 1991.

CIS (Caller Identification System)

This system confirms a transmission source at the time of a login. When a user seeks to log in to an N-th host, via N-1 hosts, to obtain a list of preceding hosts, the CIS system queries in turn the (N-1)th host and the first to (N-2)th hosts. When the CIS system confirms that the results of the inquiries indicate that no illegal activities have occurred, it permits the login. This system is used to control accesses between the hosts that are managed, and it is a premise that the CIS is introduced into the host that is managed. The procedures and methods employed for this technique are explained in detail in "Caller Identification System in the Internet Environment, H. T. Jung et al., Proceedings of the 4th Usenix Security Symposium, 1993.

Tsutsui's system

In this system, which is disclosed in U.S. Pat. No. 5,220,655, data concerning users who have accessed hosts and data concerning the processes are stored in the file system at each host, and when a trace request is received, the data are read and the tracing is performed in order to establish the access chain. If the tracing request is submitted to a different management domain, the management host for the pertinent domain collects the required information and returns it to the requesting source. A tracking service process must be operational at each host.

System provided by Hirata, et al.

According to this system, which is disclosed in Japanese Unexamined Patent Publication No. Hei 10-164064, at each host a process and a port number for a connection associated with the local host are stored in an access log recording unit, and a basic control program exchanges access information with other hosts and traces access chains. Since all the processing required to trace a communication route is performed by the basic control program, application processes running on the host need not be aware of any of the procedures that are being performed.

The problem with the above host base methods is that when an access chain is being traced and a host is reached that is not running one of these systems, the tracing process is halted at that point, continuing no further. This can occur with regularity, since on the Internet it is rare indeed for a specific home base system to be adopted by all hosts in all management domains. Further, even if a host is one that is being managed by a host base system, an intrusion may have occurred at that host and the program associated with the tracing process may have been rewritten. It is not realistic, therefore, to expect a host base system to be reliably executed in the Internet environment.

Another system that may be considered is a Caller ID system that has been reported by the U.S. Navy. To find an illegal user, this system performs a backward trace of the hosts that were illegally accessed and used as stepping-stone computers. This tracing system performs a backward search by employing the same method as that used by an intruder to illegally gain access to the stepping-stone computers. While the side conducting the search maintains that they must access the stepping-stone computers, they insist that their access is permissible because an intrusion had already occurred at the host computers. But during an actual tracing exercise, gaining access to a computer is difficult or impossible because the intruder who accessed it illegally may have corrected the hole in the security. Also, under the circumstances gaining access to the computer of a third party could be considered to be a new crime.

A network base method will now be described.

According to a study by Staniford-Chen, only the contents of communication data are focused on, and an illegal access chain is traced with the assumption that the character value of the data (distribution of the communication character types) is unique for each session (each intrusion), and is substantially the same for each connection in an access chain. At as many locations (the router, etc.) as possible on a network, character values are calculated and stored at specific time intervals each session. If an intrusion is found, multiple points on the network are examined to find a point having a character value that is similar to that recorded during the session. As a result, the hosts on the access chain can be identified. The procedures and methods employed for this technique are described in "Holding Intruders Accountable on the Internet," Stuart Staniford-Chen and L. Todd Heberlein, Proceedings of the 1995 IEEE Symposium on Security and Privacy, Oakland, Calif., 1995.

The merits of this system are that a storage log can be maintained that requires only a small memory capacity, and that the processing is easy because only the log for calculating the character value of communication data need be stored. However, since this system depends on the contents of communication data, it can not cope at all with content data that have been changed by encrypting or by language code replacement.

Another technique that may be used involves the employment in a network of a calculator monitoring system, as is disclosed in Japanese Unexamined Patent Publication No. Hei 9-2114493. When an abnormality is found in the calculator monitoring results, a log collection unit collects the traffic logs maintained by the calculator.

The tracing systems of the host base type are not appropriate for a network, such as the Internet, on which various management rights are exercised. The network base Thumbprinting that employs the data contents as reference material is a quite effective system, however, at the present time, now that encrypted communication has been become so popular, regardless of how the network base Thumbprinting system is developed, such an access chain tracing system does not hold out great promise of developing into a viable system.

It is, therefore, one object of the present invention to provide an access chain tracing method whereby, even if this method is introduced only in part of a network, a host on an access chain can be identified within the range covered by this method, and to provide an access chain tracing system therefor.

It is another object of the present invention to provide an access chain tracing method and an access chain tracing system that can cope with a case wherein data contained in a packet are encrypted en route, or language code is transformed.

It is an additional object of the present invention to provide an access chain tracing method whereby, from among a plurality of hosts on an obtained access chain, the nearest host to an attacker can be easily identified, and an access chain tracing system therefor.

It is a further object of the present invention to provide an access chain tracing method and an access chain tracing system for which only a small memory capacity is required to store data in a packet that is needed when an access chain is being traced.

It is a still further object of the present invention to provide an access chain tracing method whereby the contents of the data in a packet are not stored and communication privacy can be protected, and an access chain tracing system therefor.

SUMMARY OF THE INVENTION

According to one aspect of the present invention, an access chain is traced without depending on the data contents of a packet, and the tracing is based on data size and the time required to process the packet.

According to one more aspect of the present invention, an access chain tracing method comprises the steps of: comparing the size of the data in a packet at the time a first connection is made with the size of the data in the packet at the time a second connection is made; and employing the comparison result to determine whether the first connection and the second connection are to be included in the same chain.

According to another aspect of the present invention, an access chain tracing method comprises the steps of: recording first packet data that include the size of the data in a packet at a first connection and a detection time for the packet; recording second packet data that include the size of the data in the packet at a second connection and a detection time for the packet; transmitting the first packet data that are recorded; receiving the first packet data; comparing the first packet data with the second packet data to determine what change there was in the size of the data in the packet at the time of the first connection and in the size of the data in the packet at the time of the second connection; employing the comparison result obtained at the comparison step to determine whether the first connection and the second connection are included in the same chain; and transmitting the determination result obtained at the determination step.

According to an additional aspect of the invention, for a system wherein a packet is transmitted across a network along an access chain constituted by a plurality of connections, an access chain tracing system comprises: a comparator for comparing the size of the data in a packet at the time of a first connection with the size of the data in the packet at the time of a second connection; and a determiner for employing the comparison result obtained by the comparator to determine whether the first connection and the second connection are included in the same chain.

According to a further aspect of the invention, for a system wherein a packet is transmitted across a network along an access chain constituted by a plurality of connections, an access chain tracing system comprises: a recording unit for recording packet data that include information concerning packet size and detection time; a transmitter for transmitting the packet data to a different site for a determination to be made; and a receiver for receiving the determination result from the different site.

According to a still further aspect of the invention, a network system comprises: a first collection device for collecting first packet data that include the size of data in packet and a detection time, and for transmitting the first packet data; a second collection device for collecting second packet data that include the size of data in the packet and a detection time; and a calculation system for comparing the first packet data with the second packet data to determine what change there was in the size of the data in the packet at the time of a first connection and in the size of the data in the packet at the time of a second connection, and for employing the comparison result to determine whether the first connection and the second connection are included in the same chain.

BRIEF DESCRIPTION OF THE DRAWINGS

The invention will now be described with specific reference to the appended figures wherein:

FIG. 6 is a schematic diagram showing the data structure of a packet according to the embodiment.

FIG. 7 is a schematic diagram showing the data structure of a packet according to the embodiment.

FIG. 8 is a schematic diagram showing the data structure of a packet according to the embodiment.

FIG. 9 is a schematic diagram showing the software arrangement of a comparison determination unit according to the embodiment.

DETAILED DESCRIPTION OF THE INVENTION

As the preferred embodiment of the present invention, an explanation will be given for a method whereby, when an intruder assumes control of a remote host by repeatedly logging in using telnet or rlogin to a link of a plurality of hosts on a TCP/IP network, the logs of individual packets that are exchanged at a plurality of positions on the network along an access chain as the link are recorded, so that an intrusion route can be identified based on the header information in the packet and the time the information was detected.

Figure 1:
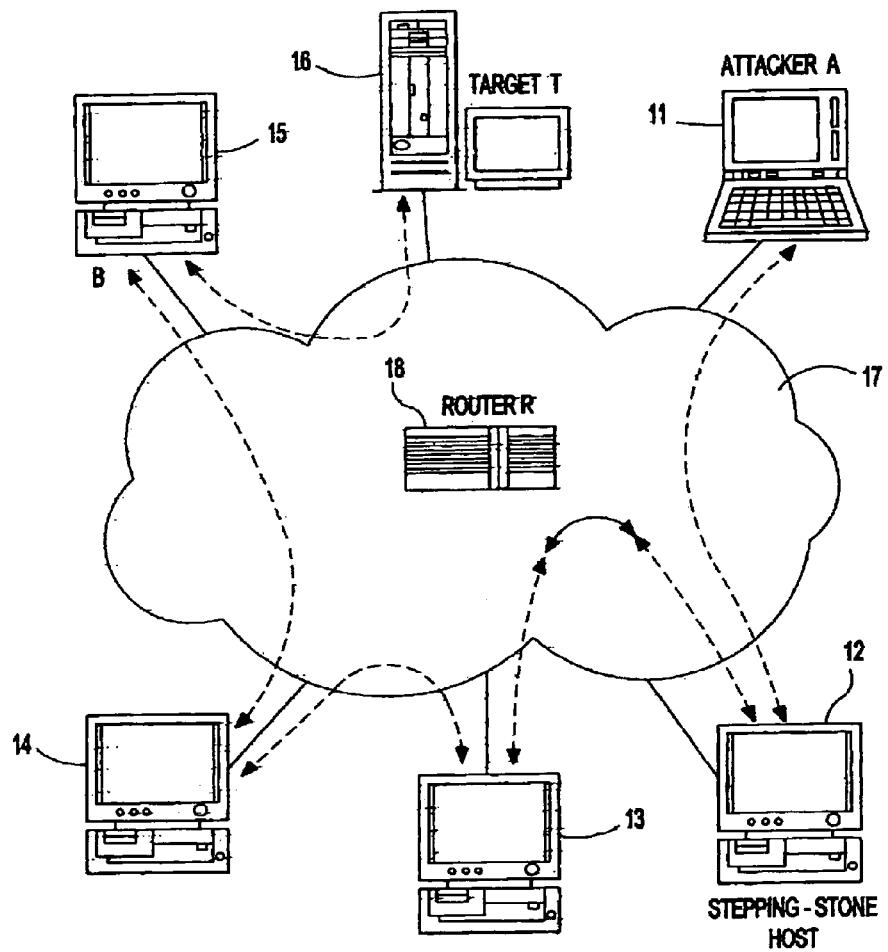
FIG. 1 is a schematic diagram illustrating the conventional configuration for an illegal access.
Figure 2:
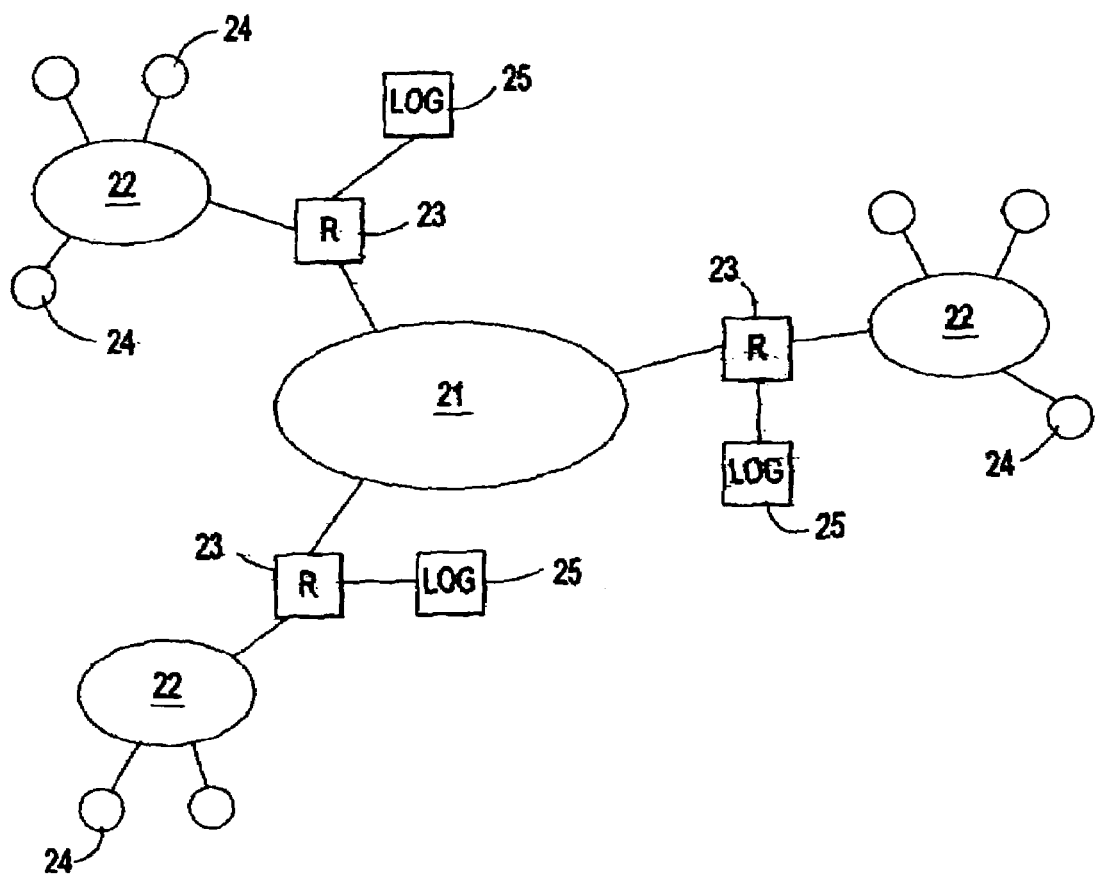
FIG. 2 is a schematic diagram showing a network system according to one embodiment of the present invention.

Intrusion along an illegal access chain on a network FIG. 2 is a schematic diagram showing a network system according to the embodiment. In FIG. 2, a backbone (or a backbone network) 21 is the basic line of a network or a basic network, and is constituted by linking together fast communication networks, such as an FDDI or an ATM, using routers or switches. Networks 22 are connected to the backbone 21, and are independently prepared for NSPs (Network Service Providers). Routers 23 and computers 24 are located on the networks 22, as are log boxes 25 that are connected to the networks 22 to collect and log information concerning packets that are transmitted across the networks 22.

Figure 3:
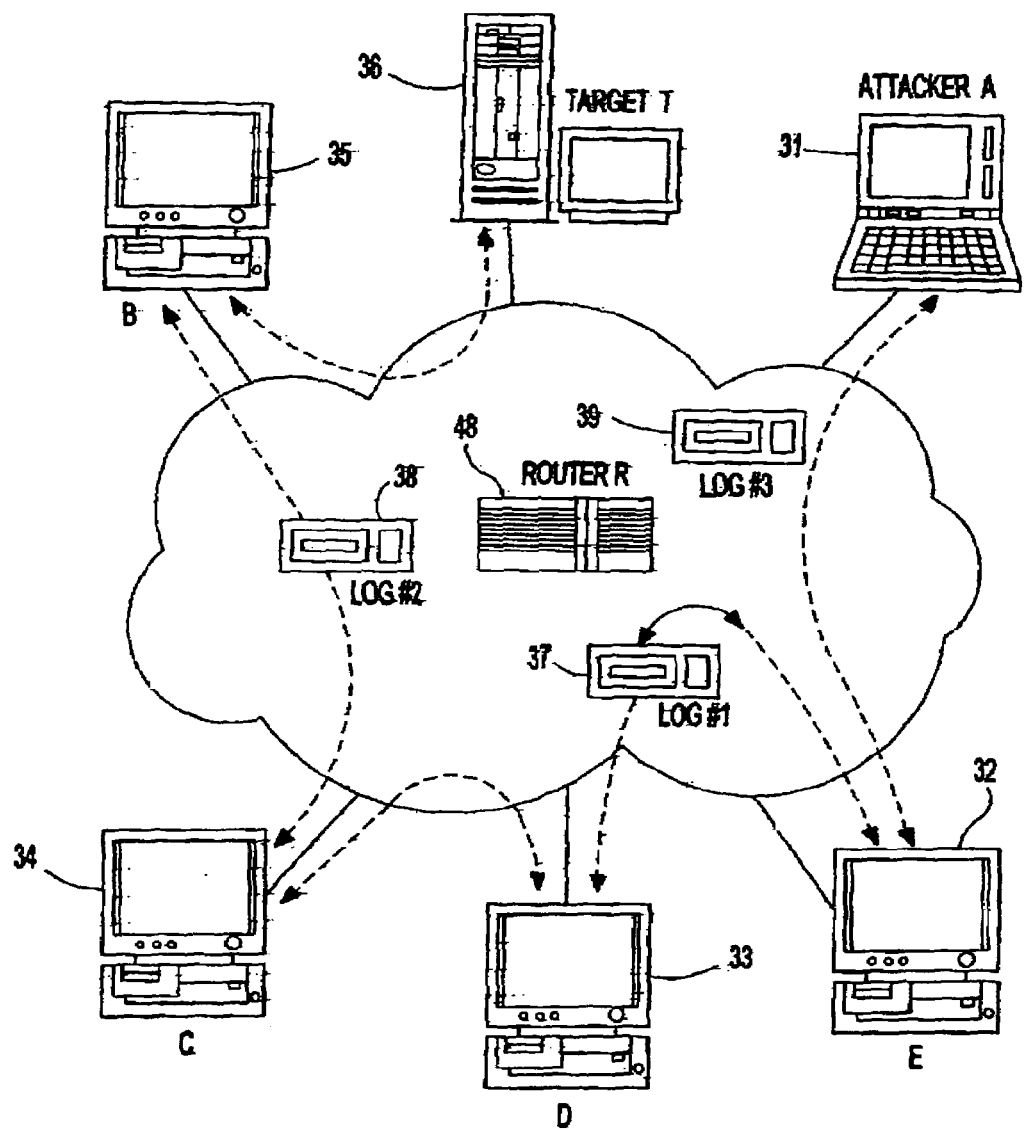
FIG. 3 is a schematic diagram illustrating the configuration for an illegal access according to the embodiment.

FIG. 3 is a conceptual diagram showing the state where, in the network system in FIG. 2, an attacker A 31, using telnet or rlogin, repeatedly and sequentially logs in at several stepping-stone hosts 32 to 35 on a network, and attacks a target computer T 36 via these stepping-stone hosts 32 to 35. The linking of the connections among the hosts is called an illegal access chain. In FIG. 3, log boxes 37 to 39 and a router 40 are also provided. While in actuality an intrusion will be handled by a plurality of routers, for convenience sake, only one backbone router is shown here, the one that is connected to the backbone network. Packets are exchanged by the stepping-stone host E 32 and the stepping-stone host D 33 via the router 40.

The attacker 31 conducts illegal intrusions by repeatedly employing telnet and rlogin to connect with the hosts. At this time, the attacker 31 uses key entries to operate a remote host that interactively serves as a stepping-stone computer. According to the normal method for employing telnet or rlogin, packets corresponding to key entries are transmitted unchanged, via a chain, from the attacker A 31 to the stepping-stone host B 35, even though data may be divided up and transmitted using a plurality of packets or may be extracted from a plurality of packets and used to assemble a single packet. A packet that corresponds to the contents, the results obtained by execution commands, that are displayed on the screen of a remote computer, are transmitted along an access chain in the reverse direction.

According to the normal method for employing telnet or rlogin, the amount of data included in packets is generally constant en route, regardless of whether the data have been used to form separate packets or have been used to assemble a single packet. In other words, once a command is entered, it is transmitted unchanged along the chain of the stepping-stone computers, and the command execution results are also transmitted unchanged along the chain in the reverse direction. All packets, regardless of their location along the chain, are transmitted in one of two directions: away from the attacker A 31 and towards the stepping-stone computer B 35, or the reverse. "The total size of the data portion is constant" means that, along the chain, extra data is not added to the data portion of packets and extra, new packets are not assembled.

Installation of a Packet Data Rrecording Device An explanation will now be given for the method used to install a log box that serves as a packet data recording device. It is preferable that packet data be recorded at as many various places as possible on the Internet. When one part of the access chain of an intruder passes through one of the places at which packet data are recorded, that portion can later be detected. Therefore, as the number of places at which data is recorded is increased, the probability that all the parts of an access chain used by an intruder will be identified is likewise increased.

On the Internet, the backbone 21 is an appropriate location at which to log in and record the transmission of packets. When data concerning packets are recorded at points on the Internet at which various NSPs (Network Service Providers) are interconnected, a record of all the packets exchanged by the networks of the NSPs can be obtained. In FIG. 2, the log boxes 25 are located at connection points on the backbone 21 and the NSPs 22. Packets that are exchanged within a closed range on the networks of the NSPs can be recorded by the NSP backbones. Therefore, the organizations that manage the backbones install PCs as log boxes 25 for relaying packets and recording their transmission, and intruders can thus be traced.

Figure 4:
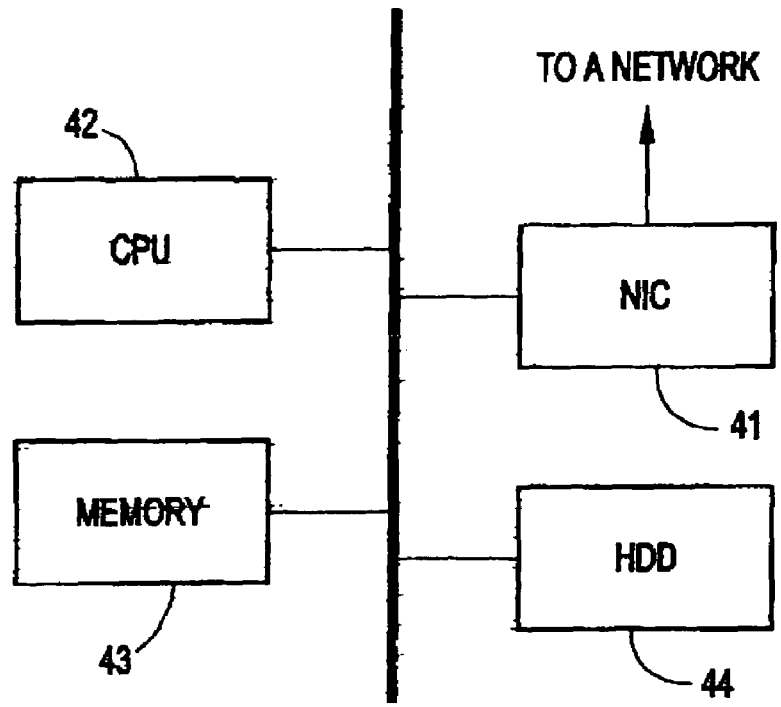
FIG. 4 is a schematic diagram showing the hardware arrangement of a log box according to the embodiment.

In this embodiment, a log box 25 that is used as packet data recording means is a PC, a dedicated apparatus may also be employed, for which a network card is provided. The network card functions as an interface for a transceiver, and the PC 25 is connected to one of connectors of the router 23. FIG. 4 is a diagram showing the hardware arrangement of the log box 25. In FIG. 4, the log box comprises: a network card 41, which is an input/output controller for controlling the input/output of packet data; an HDD 44, which is a storage device for storing a filter program and the log data for a packet; a CPU 42, which performs various processes and provides control; and a RAM 43, which is a temporary storage device used by the CPU 42.

Figure 5:
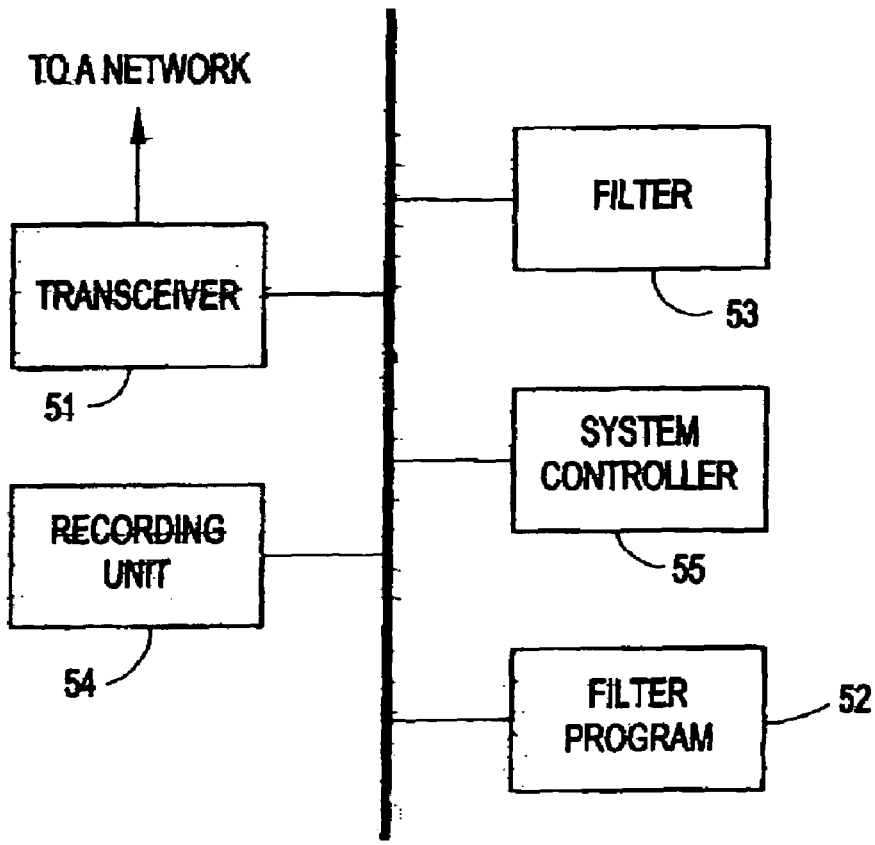
FIG. 5 is a schematic diagram showing the software arrangement of a log box according to the embodiment.

FIG. 5 is a diagram showing the software arrangement of the log box 25. The log box 25 includes a transmission/reception controller 51, which controls the storage of data reception information and the exchange of data with the outside; a filter program 52, which includes information for the extraction of required information from a packet, and controls the operation of a filter; a filter 53, which selects required information from a received packet in accordance with the filter program 52; a recording unit 54, for recording data that are selected by the filter 53; and a system controller 55, which provides overall control for the apparatus.

The processing performed by the log box 25 will now be described. A packet is transmitted from the router to the log box 25 across the network. The transmission/reception controller 51 of the log box 25 receives this packet, and transmits it to the filter 53. In accordance with the filter program 52, the filter 53 obtains necessary packet data from the received packet, and the packet data are recorded as log data in the recording unit 54. Overall control is provided by the system controller 55. A specific method for obtaining packet data will be described later.

The method used to connect the log box 25 to the network will now be explained. The network interface card mounted in the log box 25 is an ethernet card, a card that is frequently used for PCs, that forms a part of the network interface of the router 23. One ethernet connector of the router 23 is selected, and the setup is changed, so that copies of all the packets passing through the router 23 are added to the original routing destination, and are also transmitted to the address of the ethernet. The ethernet connector for the router 23 and the connector for the ethernet card of the log box 25 are connected together by a cable. Therefore, the log box 25 can receive copies of all the packets that pass through the router 23.

Recording of Packet Data

A method for recording necessary packet data will now be described. Although in this embodiment only TCP packets are recorded, another data form may be selected. The structure of a TCP packet will be explained first. For TCP/IP communication, data is basically formed into an IP packet. The IP packet is constituted by the arrangement of [IP header] [IP data]. For TCP communication (the protocol portion of the IP header represents TCP), [IP data] is constituted by the arrangement employed for [TCP header] and [TCP data].

The structure of an IP header will be described while referring to FIG. 6. The horizontal axis represents bits, and for every 32 bits (4 bytes) there is a line return, the line continuing at a location all the way to the left and one space below the previous line. Along the same line, a left bit represents an upper bit. A normal IP header with no Options is 20 bytes from Version to Destination Address. The Source Address and the Destination Address are respectively the IP address of the transmission source apparatus and the IP address of the destination (reception) apparatus. FIG. 7 is a diagram showing the structure of the TCP packet in the same manner as in FIG. 6. The normal TCP header with no Options and data is 20 bytes from Source Port to Urgent Pointer. The Source Port, the Destination Port and the Sequence Number are, respectively, the port number of the transmission source apparatus, the port number of the destination (reception) apparatus and a number provided for each packet at one connection. Since these data structures are well known, no detailed explanation will be given for them.

In order to record desired packet data, first, of all the packets that are received at the network card 41 only desired packets are selected. Packets up to the maximum designated length are extracted, and are recorded on the HDD in accordance with their arrival times. This process will now be specifically explained by using the software structure. The transmission/reception controller 51 receives packet data from the router. In accordance with the filter program 52, the filter 53 selects from the received packets only packets of the required type. In this embodiment, the filter 53 selects only TCP packets. The filter program 52 stores in advance the data size of the packets that are to be recorded, and in accordance with the data size, the filter 53 extracts from the header of a selected packet an equivalent amount of data, uses the data to perform a desired process, and records the resultant data in the recording unit 54.

FIG. 8 is a schematic diagram showing the structure used for the packet data that are written in the recording unit 54. The time whereat the packet was received by the transmission/reception controller 51 is entered in Time Stamp. The size (in bytes) of the data extracted from the received packet is entered in Caplen. The actual size (length (in bytes)) of the packet when received by the network card is entered in Len. And the data contents (bytes), equivalent in size to the size (in bytes) entered in Caplen, are written in the Data portion. The file to be written in the recording unit 54 includes the header portion, such as version information concerning the filter program 52, and the succeeding data portion in which data in the above format are recorded sequentially in the order in which they are received.

The data to be extracted from each packet need only be long enough to include the IP header and the TCP header. Since when ethernet is used the header is 14 bytes, the succeeding IP header is normally 20 bytes and the succeeding TCP header is normally 20 bytes, and the appropriate size is about 68 bytes, even when an Option is included in the IP header or the TCP header. After several packets have been written in one file, the process is temporarily halted, and a process for writing succeeding packets in another file is begun. This processing is repeated until the HDD 44 is filled, and thereafter the oldest file is overwritten. In this manner, packet data are accumulated over a period of several days. It should be noted that packet capture software can also be used as the filter program 52.

Discovery of Intrusion by an Attacker

An explanation will now be given for the processing that is performed when a system manager discovers that an intruder has gained access to a managed computer. In this case, his or her system may be the target of an attack, or may be one that the intruder intends to use as a stepping stone in an attack on another system. In either case, the packet data at the connection used for the intrusion must be recorded. Frequently, attackers prepare specific back doors in computers through which they can easily enter in the future. Thus, even when packet data are not recorded when a computer intrusion occurs, thereafter, packet data can always be recorded by another computer connected to the pertinent computer via the LAN, and another attack can be expected in the future need be waited for.

For a LAN that uses ethernet, all the network traffic on the same LAN (within the range of the connection provided by a shared hub, but excluding that available via a router) can be observed by any one of the computers on the network.

When packet data are not recorded at the time of a preceding intrusion, the packet data are recorded when an attack is again mounted on the computer. Since the packet data recorded at this time include a connection that is not related to the attacker, the connection used by the attacker must be determined. The logs of a computer whereat an intrusion has occurred are not reliable because in many cases they are rewritten by the attacker. Therefore, the time of the intrusion by the attacker, and the source IP address and the source port number that are recorded in the log box are employed to determine when a connection is made. In most cases, when a login is performed and the user ID is for a time zone and location the local user has never come across, or when a login is performed with a user ID that has not been used for a long time, that login tends to be an illegal intrusion.

Distribution of Packet Data to Cooperating Sites

When an illegal intrusion is discovered, found, the packet data at the connection used by the attacker are distributed to cooperating sites in which the log boxes on the network are installed. Assume that, for data transmission, the sites have verified each other in advance using their computers.

The log box selects desired packet data from those recorded in the recording unit 54. Basically, a connection can be specified by using the four indicators (the source IP address, the source port number, the destination IP address and the destination port number) that are extracted from the IP header and the TCP header of a packet. Thus, whether the individual packet data sets are included in the connection used by the attacker can be determined. Therefore, packet data whose indicators match are written in the file. The packet data written in the file has the same form as the packet data recorded by the recording unit 54. The data file is then distributed to each site together with a packet requesting that a search be performed. The distributed packet and the data file are received by the log box at each site, and the individual log boxes activate comparison determination programs.

The software structure of the comparison determination apparatus will now be described while referring to FIG. 9. In FIG. 9, the comparison determination apparatus includes: a transmission/reception controller 91, which controls the exchange of data with a network; a comparison determination program 92, which controls the comparison of connections and the determination of similarity; a recording unit 93, which records packet data; a controller 94, which provides overall control for the apparatus; and a comparison determiner 95, which performs a comparison and determination process in accordance with the comparison determination program 92. In this embodiment, a log box, which is a calculator and includes a network card, is in charge of both the collection of packet data and the comparison of connections; however, another calculator may perform the connection comparison and determination. Further, in this embodiment packet data are transmitted; however, instead, a desired process, such as the conversion into the sequence data used by the comparison and determination system, may be performed for the packet data, and the thus obtained data thereafter transmitted.

Processing for Each Site

An explanation will now be given for the summary of the processing performed by the log box of each cooperating site when it receives, from a site where an intrusion has occurred, a packet data file for the connection used by an attacker. First, the times for the first and the last packets in the file are examined to determine the time range within which data are to be accumulated in order to be employed for a search. The data accumulated for the pertinent time range are employed to find a pattern that is similar to the time-data size pattern at the connection used by the attacker. A score that represents the degree of similarity is provided for similar connections that are found, and several connections for which the degree of similarity is high are returned to the site at which the intrusion occurred.

Method for Specifying a Similar Connection

A method for determining the similarity of two connections will now be described. At one connection, there are two opposing data transmission directions, and a "time-sequence number" series is assumed for each direction. A series consists of a paired time at which a packet was passed and a sequence number given to the packet, for the transmission of data in one direction at the connection. As for the "sequence number," first, a random number is determined each time a TCP connection is established, and later, the data volume (bytes) is increased each time a datagram packet arrives. A "datagram packet" is a TCP packet whose data portion is greater than 0 (that does not include a packet for which there is only a header portion). Since the sequence number for the first byte of the packet data is entered in the header of the packet, the size of the data portion is added to the header, and the sequence number of the last byte of the data is obtained. Hereinafter, the sequence number of a packet represents the sequence number of the last byte of the data portion.

A specific example series is shown below. Assume that the initial sequence number is 940000 for data transmission in one direction at the connection, 9.116.158.27:23→9.116.77.25:40509. Then, the "time-sequence number" series is as follows.

| Time | Sequence number |
|---|---|
| 14:49:04.026199 | 940003 |
| 14:49:04.140934 | 940054 |
| 14:49:04.305649 | 940087 |
| 14:49:04.372342 | 940094 |
| 14:49:04.462903 | 940097 |
| 14:49:05.731234 | 940098 |
| 14:49:05.860761 | 940099 |
| 14:49:06.372575 | 940100 |
| 14:49:06.439558 | 940101 |
| 14:49:06.698750 | 940102 |
| 14:49:06.773162 | 940103 |
| ... | ... |

Figure 10:
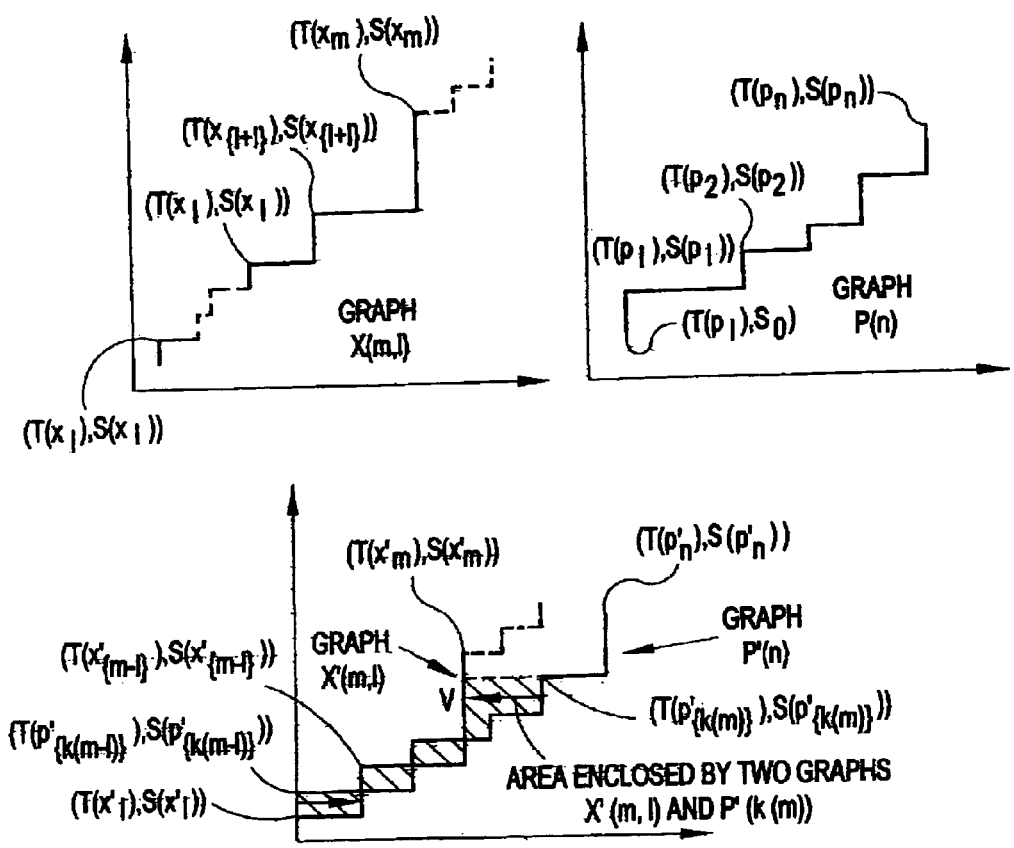
FIG. 10 is a graph for explaining a series comparison method according to the embodiment.

FIG. 10 is a graph of the series, with the horizontal axis represents the time, the vertical axis representing the sequence number, and the origin representing the time of the first packet and the initial sequence number. When the "time-sequence number" series for one direction at a specific connection is provided, a similar series is searched for in multiple other series.

Various methods are available for calculating similarity. Generally, to obtain the similarity of two real number series $\{x_1, x_2, \ldots, x_n\}$ and $\{y_1, y_2, \ldots, y_n\}$, these series are regarded as points in n-order dimensional space, and the distance between the two points is defined as $$(\Sigma|x_i - y_i|^p)^{(1/p)},$$

and as this distance value is near 0, the similarity is high. When p=2, the distance is one in the well known Euclidian space.

As an example method for providing similarity, an index can be employed that represents, when the two series are prepared as graphs and the value of each nears that of the other, how the shapes of the two matched. The value obtained when the size of the area sandwiched between the two graphs is divided by the length of the range along the vertical axis (sequence number), i.e., the average size of the gap defined along the horizontal axis (time) when the two graphs near each other, is employed as the index for the similarity. As this value approaches 0, the similarity exhibited by the two series becomes proportionally greater. For this calculation, the difference between the times for the two packet series may be added for all the sequence numbers, and the sum may be divided by the length of the range of the sequence number. Assume that the packet series of a specific stepping-stone computer is defined as A, and a packet series to be compared with it is defined as B. Since the packet series is found upstream (closer to the attacker) of the stepping-stone computer along the access chain, and since the data volume of the series B is greater than the data volume of the series A, the range of the data series B along the vertical axis of the graph must include the range of the series A along the vertical axis. In addition, the start position for the series A is located in the series B along the vertical axis. When the two graphs approach each other, the series B should be moved in parallel along the horizontal axis to a position where it does not intersect the series A. Therefore, the graph of the series B is vertically and horizontally displaced to a position whereat the size of the area sandwiched between the series A and B is minimized, while the graph of the series B includes the graph of the series A and the two graphs do not intersect each other. The resultant area sandwiched between the two graphs is divided by the length of the range of the sequence number of the series A, and the obtained value is determined to be the similarity of the two series, A and B.

In this manner, the similarity between the series in one direction at the connection and the series in the two directions at each of the connections is calculated, and series having a high similarity are found.

As another method for determining similarity, a discrete Fourier transform is performed for all the series to change series associated with time into series associated with frequency. In this case, the time whereat the datagram packet was is passed and the data volume (not the accumulated volume) are employed. The first several terms of the obtained Fourier coefficient substantially represent the characteristic of the series that is again represented along the time axis, and the dimension of the series to be compared can be reduced. A variety of methods are available for which a Fourier transform can be performed.

Calculation of the size of the area between the series A specific method for calculating the difference between two series will now be described. A file that includes packet data A at the connection used by the attacker is employed to explain the method used for calculating the similarity to one connection among the packet data D that are recorded in the log box at a specific site. The above calculation of the area size is specifically explained by this method. Refer to FIG. 10 to understand the following calculation.

The Time Stamp (time) of a packet q is denoted by $T(q)$, and the sequence number of the last byte of the data in the packet q is denoted by $S(q)$. The graph of a packet series $Q=\{q_1, q_2, \ldots, q_n\}$ is a two-dimensional step-shaped graph with the horizontal coordinate being $T(q_i)$ and the vertical coordinate being $S(q_i)$. When the initial sequence number of the packet series Q is Sq, the graph is obtained by connecting the points $(T(q_1), Sq)$, $(T(q_1), S(q_1))$, $(T(q_2), S(q_1))$, $(T(q_2), S(q_2))$, ..., $(T(q_i), S(q_{\{i-1\}}))$, $(T(q_i), S(q_i))$, ..., $(T(q_n), S(q_{\{n-1\}}))$, and $(T(q_n), S(q_n))$.

1) One of the two directions at the connection is designated by referring to the file in which the packet data A is written, and the following packet series P for that direction is generated.

$$P(=P(n))=\{p_1, p_2, \ldots, p_n\}$$

With the series P being used as a reference, the similarity to this reference is calculated for each packet series in the packet data.

2) Assume that P'(n) denotes the starting point for the graph of the packet series $P(n)=\{p_1, p_2, \ldots, p_n\}$.

$$P'(n)=\{p'_1, p'_2, \ldots, p'_n\},$$

$$T(p'_k)=T(p_k)-T(p_1),$$

$$S(p'_k)=S(p_k)-S_0 (1 \leq k \leq n) \text{ ($S_0$ is the initial sequence number)}$$

3) A packet x is extracted from the head of the packet data D. One of the directions at the connection to which the packet x belongs can be obtained by examining the combination of the header (the source IP, the source port, the destination IP and the destination port) of the packet x. When the packet x is regarded as the m-th packet in that direction, the pertinent packet series is represented as $X=\{x_1, x_2, \ldots, x_m, \ldots\}$. ($x=x_m$)

4) The following steps 4-1), 4-2), 4-3) and 4-4) are performed for l=1, 2, ..., m.

4-1) Assume that X'(m,l) denotes the starting point for the graph of the packet series X(m,l)={$x_l$, $x_{\{l+1\}}$, ..., $x_m$}.

$X'(m,l) = \{x'_1, x'_{\{l+1\}}, \ldots x'_m\}$, $T(x'_k) = T(x_k) - T(x_l)$, $S(x'_k) = S(x_k) - S(x_{\{l-1\}})$ $(1 \leq k \leq m)$ 4-2) When the index k(m) of the series P'(n) is defined as $k(m) = \max\{k | S(p'_k) \leq S(x'_m)\}$, the size M(m,l) of the area that is sandwiched between the graph for the series X'(m,l) and the graph for the series P'(k(m)), i.e., the size of the area enclosed by the linear lines $y = S(p'_{\{k(m)\}})$ parallel to the two graphs along the horizontal axis is calculated. It should be noted that the portion whereat the graph of X'(m,l) is on the right of the graph of P'(k(m)) is obtained as a positive area, and the portion on the left is obtained as a negative area.

[Equation 1]

4-3) When the graph of X'(m,l) is extended from the graph of P'(n), the obtained difference for the time stamps is stored as U (a positive value). When the graph of X'(m,l) is extended from the graph of P'(n), the obtained difference for the time stamps is stored as V (a negative value). In the calculation of the difference in the time M(m,l) in step 4-2), $T(x'_{\{j-1\}}) - T(p'_{\{k(j-1)+1\}})$, $T(x'_j) - T(p'_{\{k(j-1)+1\}})$, $T(x'_j) - T(p'_i)$  $(k(j-1)+2 \leq i \leq k(j))$, where j=1, 2, ..., m. The maximum obtained value is U and the minimum value is V.

4-4) Whether the height of the graph of X'(m,l) is equal to or greater than the height of the graph of P'(n) is determined by using $k(m) \geq n$.

When this condition is not established, "l" is incremented by one, and the process is returned to step 4-1.

When the above condition is established, the size of the sandwiched area is unchanged regardless of whether or not m is further incremented. Thus, the graph of X'(m,l) is shifted horizontally, so that the two graphs X'(m,l) and P'(n) do not intersect each other. Then, the size of the area newly sandwiched by the two graphs is calculated. Among the areas obtained by shifting U to the left and by shifting V to the right, a smaller area is defined as M(l). That is, $M(l) = \min\{|M(m,l) - U \times S(p'_n)|, |M(m,l) - V \times S(p'_n)|\}$.

If the area M(l) is the smallest of M(0), M(1), ... and M(l), this is recorded as the minimum area M. The index l for the start of the packet and the time stamp difference (U or V) that are obtained at this time are also recorded. Then, "l" is incremented by one and the process is returned to step 4-1).

5) The steps 3 and 4 are repeated until no more packets are present, and the smallest area M relative to the series P is employed to calculate the similarity M/S(p'_n) for the series in each direction at each of the connections. The obtained similarities are sorted in the ascending order, and the direction of the connections is obtained in the descending order of the similarities.

Specifying and Returning a Similar Connection

The log boxes at the individual sites select several series whose similarities, obtained using the above calculation, are equal to or smaller than a predetermined value. The selected series and the connections including these series and the similarities are returned to a request source site. Upon the receipt of these data from the sites, the requesting site finds a connection having an especially high similarity, which is probably a connection on the same chain. Further, the requesting site communicates with the managers of the hosts, confirms that the hosts were used as stepping stones by the attacker, and finally begins tracing manually. While taking into account the fact that the attacker may intrude on the system again, a PC for recording packet data is installed for the backbone of the network to which the IP address, which is one of the four elements of the connection that exhibits the most similarity, so that the monitoring performed to detect the attacker can be thereafter improved.

In this embodiment, a log box performs both the recording of packet data and the comparison and the determination of a connection, and communicates with other computers on the network. However, when the log box that records the communication contents is limited to performing only a completely passive function and does not transmit any data, the intrusion of a third party can be prevented. Furthermore, in this embodiment, the access chain is traced to find an illegal intruder; however, the present invention is not limited to this. The method of the invention can be applied, for example, for the search of a computer that has malfunctioned or has failed.

The invention claimed is:

1. For a system wherein a packet is transmitted across a network along an access chain constituted by a plurality of connections, an access chain tracing system comprising:
    a comparator for comparing stored data including at least packet size and data length extracted from a packet at the time of a first connection with stored data including at least packet size and data length extracted from said packet at the time of a second connection; and
    a determiner for employing the comparison result obtained by said comparator to determine whether the packet at the first connection and the packet at the second connection are the same packet and whether said first connection and said second connection are to be included in the same access chain for tracing the path of said packet.

2. The access chain tracing system according to claim 1, further comprising:
    a receiver for receiving first packet data that includes said data length and said detection time of said packet at said first connection;
    a transmitter for transmitting the results obtained by said determiner.

3. The access chain tracing system according to claim 2, further comprising:
    a searching unit for searching comparison packet data based on said detection time included in said first packet data that are received; and
    a selector for selecting a packet at said second connection based on the search results obtained at said searching unit.

4. The access chain tracing system according to claim 2, wherein said detection time is specified by a time stamp included in packet data, and said data lenath is specified by a sequence number.

5. The access chain tracing system according to claim 1, wherein said comparator calculates a difference between a first series of stored data, which is specified based on said data length and a detection time of said packet at said first connection, and a second series of stored data, which is specified based on said data length and a detection time of said packet at said second connection; and wherein said determiner employs said difference to determine whether the packet at the first connection and the packet at the second connection are the same packet and whether said first and said second connections are to be included in the same access chain.

6. The access chain tracing system according to claim 5, wherein said comparator sequentially compares said first series of stored data with a plurality of segments of said second series of stored data that are formed by shifting the first term of one of said series of stored data.

7. For a system wherein a packet is transmitted across a network along an access chain constituted by a plurality of connections, an access chain tracing method comprising the steps of:
  comparing stored data including at least packet size and data length extracted from a packet at the time a first connection is made with stored data including at least packet size and data length extracted from said packet at the time a second connection is made; and
  employing the comparison result to determine whether the packet at the first connection and the packet at the second connection are the same packet and whether said first connection and said second connection are to be included in the same access chain for tracing the path of said packet.

8. The access chain tracing method according to claim 1, wherein said comparison step includes a step of calculating a difference between a first series of stored data, which is specified based on said data length and a detection time of said packet at said first connection, and a second series of stored data, which is specified based on said data length and a detection time of said packet at said second connection; and wherein, at said determination step, said difference is employed to determine whether the packet at the first connection and the packet at the second connection are the same packet and whether said first and said second connections are to be included in the same access chain.

9. The access chain tracing method according to claim 8, wherein said comparison step includes a step of sequentially comparing said first series of stored data with a plurality of segments of said second series of stored data that are formed by shifting a first term of one of said series of stored data.

10. The access chain tracing method according to claim 1, further comprising steps of:
  receiving first packet data that includes said data length and said detection time of said packet at said first connection;
  searching comparison packet data based on said detection time included in said first packet data that are received; and
  selecting a packet at said second connection based on the search results obtained at said search step.

11. The access chain tracing method according to claim 10, wherein said detection time is specified by a time stamp included in packet data, and said data length is specified by a sequence number.

12. A network system comprising:
  a first collection device for collecting first packet data comprising packet size, data length and a detection time, and for transmitting said first packet data;
  a second collection device for collecting second packet data comprising packet size, data length and a detection time; and
  a calculation system for comparing said first packet data with said second packet data to determine what change there was in the data length in said packet at the time of a first connection and in the data length in said packet at the time of a second connection, and for employing the comparison result to determine whether the packet at the first connection and the packet at the second connection are the same packet and whether said first connection and said second connection are included in the same access chain.

13. The network system according to claim 12, wherein said calculation system calculates a difference between a first series, which is specified based on said data length and a detection time of said packet at said first connection, and a second series, which is specified based on said data length and a detection time of said packet at said second connection, and employs said difference to determine whether the packet at the first connection and the packet at the second connection are the same packet and whether said first and said second connections are to be included in the same access chain.

14. An access chain tracing method comprising the steps of:
  recording first packet data that include at least packet size and data length extracted from a packet at a first connection and a detection time for said packet;
  recording second packet data that include at least packet size and data length extracted from said packet at a second connection and a detection time for said packet;
  transmitting said first packet data that are recorded;
  receiving said first packet data;
  comparing said first packet data with said second packet data to determine what change there was in the data length in said packet at the time of said first connection and in the data length in said packet at the time of said second connection;
  employing the comparison result obtained at said comparison step to determine whether the packet at the first connection and the packet at the second connection are the same packet and whether said first connection and said second connection are included in the same access chain; and
  transmitting the determination result obtained at said determination step.

15. A computer-readable storage medium on which a program is stored to permit a computer to perform the method for an access chain tracing method comprising the steps of:
  comparing stored data including at least packet size and data length extracted from a packet at the time a first connection is made with stored data including at least packet size and data length extracted from said packet at the time a second connection is made; and
  employing the comparison result to determine whether the packet at the first connection and the packet at the second connection are the same packet and whether said first connection and said second connection are to be included in the same access chain for tracing the path of said packet.

* * * * *